May 15, 1951 C. HANSEN ET AL 2,552,964
DITCH DIGGER ATTACHMENT
Filed Dec. 18, 1947 2 Sheets-Sheet 2
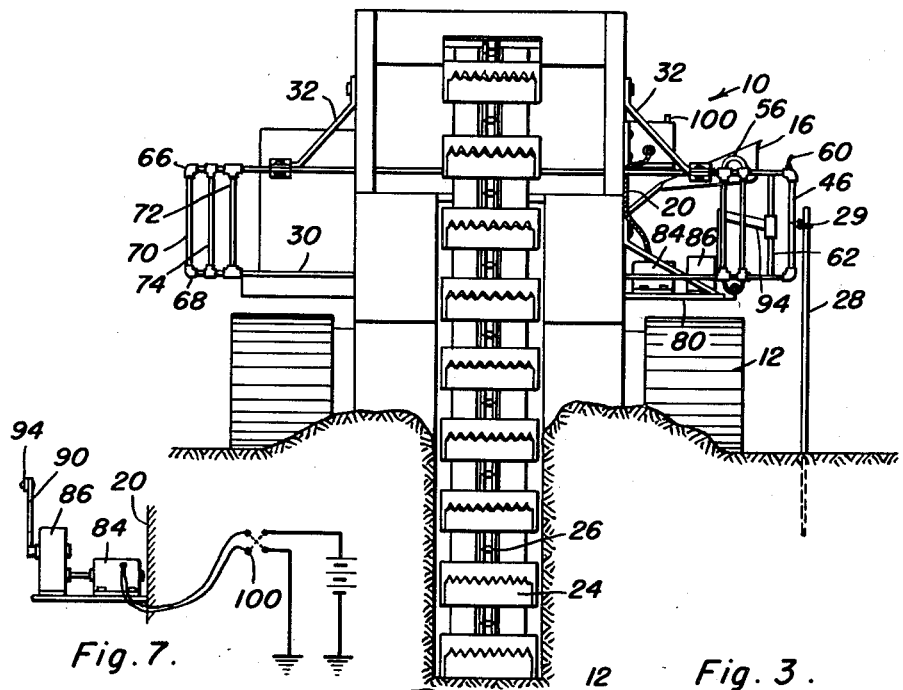
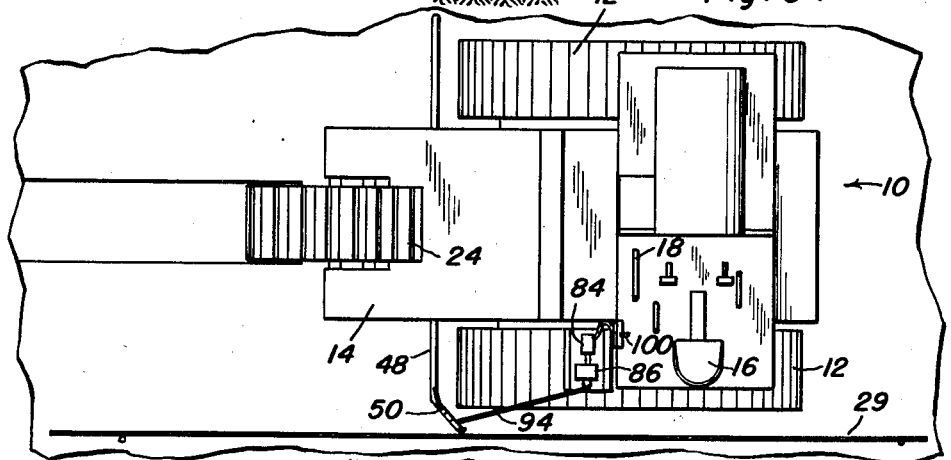
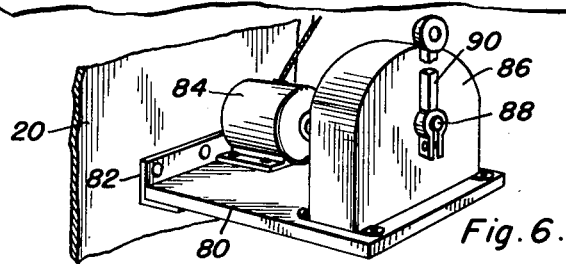
Chris Hansen
Jens Hansen
INVENTORS.

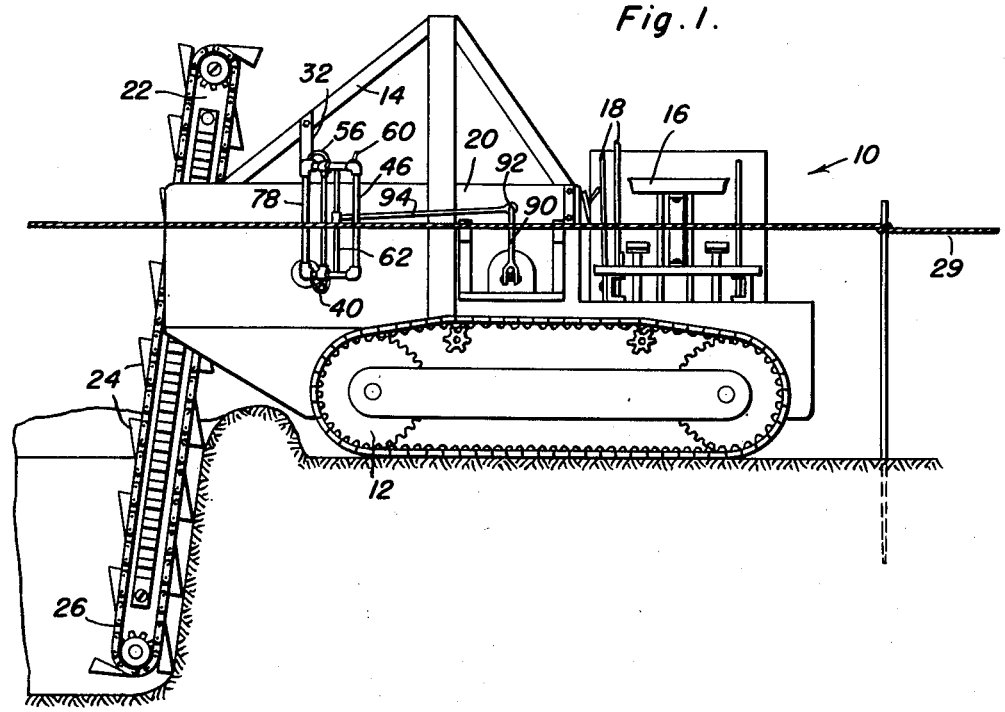
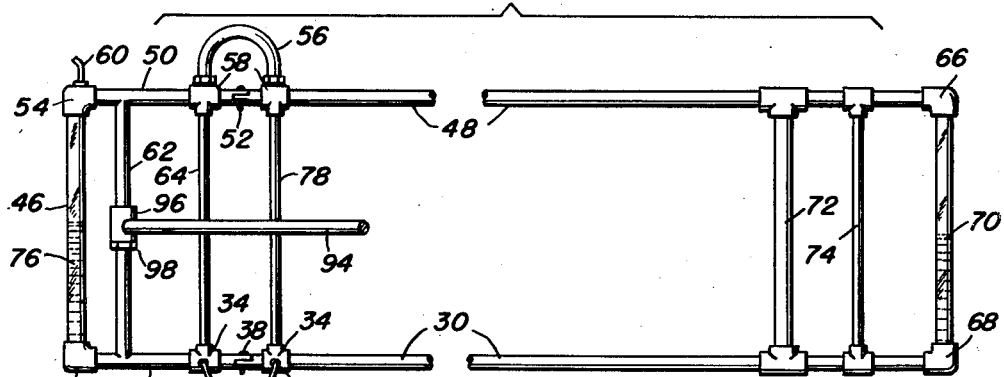
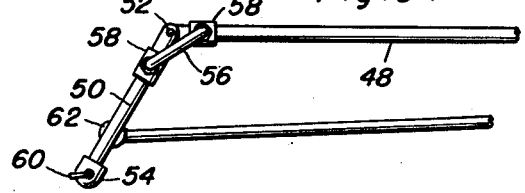

Patented May 15, 1951

2,552,964

UNITED STATES PATENT OFFICE 2,552,964

DITCH DIGGER ATTACHMENT

Chris Hansen and Jens Hansen, Sumner, Iowa

Application December 18, 1947, Serial No. 792,386

2 Claims. (Cl. 33—185)

This invention relates generally to gauges and more particularly to a gauge to indicate slight inclination of a device whereon the gauge is secured, the gauge operating upon the principle of a U-shaped member partially filled with fluid.

It is well understood that a U-tube with fluid contained therein and partially filling the tube, the tube being ordinarily made of glass and the fluid being colored, is well known, and it is further admitted that the provision of the flexible connection between the upwardly extending glass tubes, such as are used in laboratories and the like, is not new. However, this invention envisages the provision of a base tube constructed of rigid material and divided into two portions with a swivel joint therebetween so that one portion of the base tube is allowed to move relative to the other portion in one plane only. The invention further contemplates provision of power means for shifting the one end portion of the base tube with the upwardly extending tube carried thereby, so that the effective length of the base tube, measured longitudinally of the other end portion or fixed portion of the base tube may be changed, that is, the effective length of the gauge can be changed. Finally, this invention contemplates provision of power means for effecting this shifting including an electric motor, reduction gears connected with a crank and a rigid arm connecting the crank to the portion of the base tube which can be shifted, or equivalent hydraulic actuating means.

The primary object of this invention is to provide a gauge which is particularly adapted for use with a ditch digging machine for indicating to the operator of the machine the tilting of the frame and digger boom, the operator thus advised being able to immediately correct the adjustment of the boom to counteract the change in the depth of the channel or ditch dug by the machine as a result of this tilting.

Another object of this invention, inherent in the foregoing object, is to provide means whereby a ditch or channel may be dug accurately to a depth desired.

Still another object of this invention is to provide a sight gauge which may be secured to the boom of a ditch digging machine, or to another portion of the machine, adjacent the operator and adjacent to a grade line, one portion of the gauge being constructed of transparent material so that liquid contained in the gauge can be viewed and the machine operated so that the level of this liquid is used to direct the manipulation of the boom relative to the machine, so that tilting of the machine can be prevented from causing digging of uneven depth.

Still another object of this invention is to provide a gauge of this character with means allowing the sight glass of the gauge to be shifted transversely of the machine, in order that this sight glass may be kept at all times adjacent the grade line, while allowing the portion of the gauge concerned to be retracted slightly toward the machine so as to avoid the posts or stakes ordinarily used to support the grade line.

Yet another object of this invention is to provide a gauge of this character which extends transversely of the ditch digging machine to each side thereof to increase the sensitivity and adaptability of the gauge.

And a last object to be specifically mentioned is to provide a gauge of this character which is relatively inexpensive and practicable to manufacture, which is extremely simple and convenient to use, and which will give generally efficient and durable service.

With these objects definitely in view, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 1 is a side elevational view of a ditch digging machine, a grade line supported on stakes to indicate the proposed location and depth of the ditch, and this invention operatively combined therewith;

Figure 2 is a front end view of the structure illustrated in Figure 1;

Figure 3 is a top plan view of this same structure;

Figure 4 is an enlarged broken side elevational view of the gauge;

Figure 5 is a fragmentary detail view of a portion of the gauge, the figure being a top plan view of this portion;

Figure 6 is a perspective view of an electric motor, reduction gear assembly housing and crank operated by the gears, the figure being in perspective and including representation of a suitable bracket means for supporting the said elements; and Figure 7 is a view of the electric motor, reduction gear assembly housing, crank means and reversing switch control means.

Similar characters of reference designate similar or identical parts and portions throughout the specification and throughout the several views of the drawings.

Referring now to the drawings in detail, this invention includes a ditch digger, generally indicated by the numeral 10 and including caterpillar traction means generally indicated at 12, a digger boom support 14, an operator's seat 16, controls illustrated at 18, a side frame member 20 and a boom 22 carrying a plurality of spades 24 which are in turn carried on endless chains 26. The particular construction of the various parts mentioned immediately above is immaterial in this application and these parts are mentioned in order to show the positional and functional relationships of this invention with a typical ditch digging machine. The invention will also include a plurality of spaced upright stakes 28 and a grade line 29 carried thereby to indicate the location and the desired depth of the ditch to be dug.

The gauge includes a base tube 30 which is secured by means of angle brackets 32 or any other suitable means to the boom support 14. The base tube 30 is divided and pivotally jointed, the drawings illustrating the method of accomplishing this including the provision of fittings 34 secured to the adjacent ends of the two sections of the base tube, the pivoted portion being represented by the numeral 36 for purposes of reference in this application. It will be noted that the adjacent ends of the two sections of the base tube are each closed and provided with a locking pivot means represented at 38 whereby the main section of the base pipe and the pivoted section 36 are made shiftable relatively in one plane only. The flexible connection 40 is secured between the two fittings 34 providing communication between the two sections of the base tube, suitable nipples 42 being provided to attach the flexible member 40. The pivoted section 36 has terminally secured thereto an elbow 44 which supports a glass tube 46. Upper tube sections 48 and 50, of a character similar to the tube sections described above are pivoted together at 52, the elbow 54 supporting the top end of the glass tube 46 and the flexible coupling 40 being replaced at the top by an inverted U-shaped tube 56 which is very loosely retained in fittings 58 so as to prevent binding when the sections 48 and 50 are moved relatively. An air vent 60 may be provided on the elbow 54, and the sections 36 and 50 are joined together by vertical rods 62 and 64, the latter being terminally secured to the corresponding fittings 34 and 58. The bends of the pipe sections 30 and 48 remote from the glass tube 48 are provided with elbows 66 and 68 and a connecting tube 70, as well as supporting rods 72 and 74. The base tube 30, including the section 36, and the glass tube 46 and tube 70 contain liquid 76, the amount of liquid being such that when the glass tube 46 is vertical, this tube is substantially half filled with liquid. The function of the upper portion of the apparatus described immediately above, that is, the tube sections 48 and 50 and their connecting members, is primarily that of a cover and dust shield and as reinforcing structure for the other portions of the assembly. The fittings 34 and 58, remote from the glass tube 46 are joined by a rigid rod 78.

As best illustrated in Figure 6, a table 80 supported on an angle bracket 82 which is, in turn, secured to the side frame member 20, is used to support an electric motor 84 and a gear housing 86 in which are operatively mounted a set of reduction gears, not illustrated, connected with the electric motor 84 and driving a shaft 88 extending outside the housing 86 for connection to a crank 90. The crank 90 is pivotally connected at 92 to a rigid link 94, the other end of which is pivotally connected by means of a sleeve encircling the rod 62 and supported by a shoulder 98, to the portion of the gauge which is made pivotally adjustable as described in preceding paragraphs, so that the glass tube 46 may be moved away from the stakes 28 as the ditch digging machine is propelled forwardly. In other words, the electric motor 84 is of reversible type and controlled by switch means represented at 100 so that the crank 90 may be moved in two directions causing the rigid link 94 to pull and to push the rod 62 so that the glass tube 46 is moved arcuately.

The operation of this invention will be clearly understood from the foregoing description of the mechanical details thereof, taken in connection with the above recitation of the objects sought to be achieved by this invention. In recapitulation, it may be noted that the electric motor 84 is provided with a view to facilitating somewhat remote control of the gauge with a minimum of manual control, while allowing the gauge to be made accurately controllable. It will be realized that the pivoted portion of the gauge must be very quickly retracted and again advanced toward the grade line 29 when the machine is passing one of the stakes 28, that is, when the glass gauge 46 is moved adjacent to this stake. It will be clear that the device is adapted to be so adjusted that the level of the liquid 76 in the glass tube 46 corresponds exactly with the height of the grade line 29, so that the operator may tell at a glance whether or not the proper adjustment of the controls 18 is being maintained to produce a ditch of the required depth. The electric motor may be replaced by hydraulic means and obviously many minor variations may be made in this invention without departure from the spirit and scope thereof, the specification and drawings being represented as illustrative rather than limiting, and this invention should be limited only in accordance with the proper interpretation of the terminology used in the subjoined claims.

Having described the invention, what is claimed as new is:

1. A gauge comprising a pair of horizontally spaced upwardly extending tubes, a base tube of rigid material connecting the lower ends of the pair of tubes, a swivel joint in said base tube allowing pivotal horizontal movement of one end portion of said base tube and a corresponding upwardly extending tube, said upwardly extending tubes being transparent, and a fluid partially filling said upwardly extending tubes and filling said base tube, a ditch digging machine, said gauge being secured on the machine with the base tube extending transversely of the machine and said transparent portion being visible to an operator of the machine, a plurality of spaced upright stakes, a grade line secured to and between the stakes and immediately adjacent to one of said transparent tubes at the upper level of the fluid in said transparent tubes, the said swivel joint allowing said end portion and the corresponding upwardly extending tube to be swung horizontally to pass said stakes while the ditch digging machine is advanced along the grade line, and remote control means whereby the operator of the machine may shift said one end of the base tube.

2. A gauge to indicate slight inclination of a ditch digging machine whereon the gauge is secured, comprising a pair of horizontally spaced upwardly extending tubes, a base tube of rigid material connecting the lower ends of the pair of tubes, a swivel joint in said base tube allowing pivotal movement of one end portion of said base tube in one plane only, said plane being substantially normal to a portion of one upwardly extending tube, said upwardly extending tubes being transparent, a fluid partially filling said upwardly extending tubes and filling said base tube, and means to shift said one end portion of the base tube comprising a reversible motor and reduction gears operatively connected to a shaft, a crank on said shaft, and a rigid link connected to said crank and to said one end portion of the base tube.

CHRIS HANSEN.
JENS HANSEN.

REFERENCES CITED

The following references are of record in the file of this patent:

UNITED STATES PATENTS

| Number | Name | Date |
| --- | --- | --- |
| 1,099,385 | Linga | June 9, 1914 |
| 1,825,258 | Barber | Sept. 29, 1931 |
| 1,938,216 | Damerell | Dec. 5, 1933 |
| 2,184,090 | Balsiger | Dec. 19, 1939 |
| 2,362,325 | Thurmond | Nov. 7, 1944 |
| 2,379,350 | Gubrud | June 26, 1945 |
| 2,405,634 | Batterman | Aug. 13, 1946 |

FOREIGN PATENTS

| Number | Country | Date |
| --- | --- | --- |
| 6,742 | Great Britain | Dec. 23, 1834 |
| 336,310 | France | Jan. 11, 1904 |